(12) United States Patent
Nakahara (10) Patent No.: US 6,674,546 B1
(45) Date of Patent: Jan. 6, 2004

(54) IMAGE PROCESSING METHOD ACCORDING TO SORT OF IMAGE AND IMAGE PROCESSING APPARATUS

(75) Inventor: Nobuhiko Nakahara, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/468,064

(22) Filed: Dec. 20, 1999

(30) Foreign Application Priority Data

Dec. 25, 1998 (JP) .......................................... 10-371290

(51) Int. Cl.[7] .............................................. G06K 15/00
(52) U.S. Cl. ......................... 358/1.9; 358/2.1; 358/3.13
(58) Field of Search ........................ 358/2.1, 1.9, 3.01, 358/3.06, 3.09, 3.13

(56) References Cited

U.S. PATENT DOCUMENTS 5,870,503 A * 2/1999 Kumashiro ................. 382/252

FOREIGN PATENT DOCUMENTS

| JP | 9-233323 | 9/1997 | ............ H04N/1/40 |
| JP | 10-191054 | 7/1998 | .......... H04N/1/405 |
| JP | 11-187265 | 7/1999 | .......... H04N/1/405 |

* cited by examiner

Primary Examiner—Jerome Grant, II
(74) Attorney, Agent, or Firm—Frishauf, Holtz, Goodman & Chick, P.C.

(57) ABSTRACT

The invention provided an image processing method having the steps of, storing a plurality of multi-level dither threshold value arrangements employed for a multi-level dither process, discriminating a given first gradation image data expressing one pixel by a first bit number into an image field emphasizing a resolution and an image field emphasizing a gradation, selecting an optimum multi-level dither threshold value arrangement from a plurality of multi-level dither threshold value arrangements on the basis of a discrimination result by the discriminating step, and converting the gradation image data into a second gradation image data expressing one pixel by a second bit number less than the first bit number according to a multi-level dither process on the basis of the selected optimum multi-level dither threshold value arrangement. Accordingly, it is possible to perform a multi-level dither process which establish both of a resolution in a character/line image field and a gradation in a photo image field.

18 Claims, 10 Drawing Sheets

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |

FIG. 8A

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 8 | 15 | 22 | 29 | 36 | 43 | 50 |
| 2 | 2 | 9 | 16 | 23 | 30 | 37 | 44 | 51 |
| 3 | 3 | 10 | 17 | 24 | 31 | 38 | 45 | 52 |
| 4 | 4 | 11 | 18 | 25 | 32 | 39 | 46 | 53 |
| 5 | 5 | 12 | 19 | 26 | 33 | 40 | 47 | 54 |
| 6 | 6 | 13 | 20 | 27 | 34 | 41 | 48 | 55 |
| 7 | 7 | 14 | 21 | 28 | 35 | 42 | 49 | 56 |

FIG. 8B

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 9 | 10 | 12 | 14 | 17 | 20 | 24 | 28 |
| 3 | 11 | 13 | 16 | 19 | 23 | 27 | 32 | 36 |
| 4 | 15 | 18 | 22 | 26 | 31 | 35 | 40 | 44 |
| 5 | 21 | 25 | 30 | 34 | 39 | 43 | 47 | 50 |
| 6 | 29 | 33 | 38 | 42 | 46 | 49 | 52 | 54 |
| 7 | 37 | 41 | 45 | 48 | 51 | 53 | 55 | 56 |

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 9 | 10 | 11 | 13 | 15 | 17 | 20 | 23 |
| 3 | 12 | 14 | 16 | 19 | 22 | 25 | 28 | 31 |
| 4 | 18 | 21 | 24 | 27 | 30 | 33 | 36 | 39 |
| 5 | 26 | 29 | 32 | 35 | 38 | 41 | 44 | 47 |
| 6 | 34 | 37 | 40 | 43 | 46 | 49 | 51 | 53 |
| 7 | 42 | 45 | 48 | 50 | 52 | 54 | 55 | 56 |

FIG. 10B

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 9 | 11 | 14 | 18 | 23 | 29 | 35 | 41 |
| 3 | 10 | 13 | 17 | 22 | 28 | 34 | 40 | 46 |
| 4 | 12 | 16 | 21 | 27 | 33 | 39 | 45 | 50 |
| 5 | 15 | 20 | 26 | 32 | 38 | 44 | 49 | 53 |
| 6 | 19 | 25 | 31 | 37 | 43 | 48 | 52 | 55 |
| 7 | 24 | 30 | 36 | 42 | 47 | 51 | 54 | 56 |

FIG. 10C

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 9 | 10 | 12 | 14 | 17 | 20 | 24 | 28 |
| 3 | 11 | 13 | 16 | 19 | 23 | 27 | 32 | 36 |
| 4 | 15 | 18 | 22 | 26 | 31 | 35 | 40 | 44 |
| 5 | 21 | 25 | 30 | 34 | 39 | 43 | 47 | 50 |
| 6 | 29 | 33 | 38 | 42 | 46 | 49 | 52 | 54 |
| 7 | 37 | 41 | 45 | 48 | 51 | 53 | 55 | 56 |

FIG. 10D

PIXEL NO. (REFERENCE VALUE)

| THRESHOLD PLAIN | 1 | 2 | 3 | 4 | 5 | 6 | 7 | 8 |
|---|---|---|---|---|---|---|---|---|
| 1 | 1 | 2 | 3 | 4 | 9 | 12 | 16 | 20 |
| 2 | 5 | 6 | 8 | 11 | 15 | 19 | 24 | 28 |
| 3 | 7 | 10 | 14 | 18 | 23 | 27 | 32 | 36 |
| 4 | 13 | 17 | 22 | 26 | 31 | 35 | 40 | 44 |
| 5 | 21 | 25 | 30 | 34 | 39 | 43 | 47 | 50 |
| 6 | 29 | 33 | 38 | 42 | 46 | 49 | 52 | 54 |
| 7 | 37 | 41 | 45 | 48 | 51 | 53 | 55 | 56 |

IMAGE PROCESSING METHOD ACCORDING TO SORT OF IMAGE AND IMAGE PROCESSING APPARATUS

BACKGROUND OF THE INVENTION

The present invention relates to an image processing method which processes a multi-level input gradation image data on the basis of a multi-level dither method so as to convert into gradation image data having the smaller number of gradations, and an image processing apparatus therefore.

Conventionally, in an image forming apparatus which employs a line head such as a line LED (light emitting diode), a line thermal head and a line ink jet head, such as a printer and the like, a two-value image is formed by printing dots having the same size on a recording sheet according to a resolving power of the head, that is, according to an interval in a raster direction of a plurality of LED light emitting elements serving as recording elements arranged in a line in the case of the line LED head, according to an interval in a raster direction of a plurality of heat generating resistances serving as recording elements arranged in a line in the case of the line thermal head and according to an interval in a raster direction of a plurality of ink discharge ports serving as recording elements arranged in a line in the case of the line ink jet head. Further, the head is scanned plural times with changing a position in the raster direction so as to print the dots in a resolution more than the intervals of the respective recording elements, whereby the two-value image is formed.

In these image forming apparatuses, images of characters and lines are simply reproduced as a two-value image corresponding to the resolution of the head, and a photo image is reproduced according to a halftone process such as an ordered dither method or an error diffusing method. In the halftone process in this case, it is very hard to achieve both of a maintenance of high resolution and a reproduction of high gradation, and particularly in the ordered dither process, the resolution and the gradation have opposite characteristics.

Figure 14:
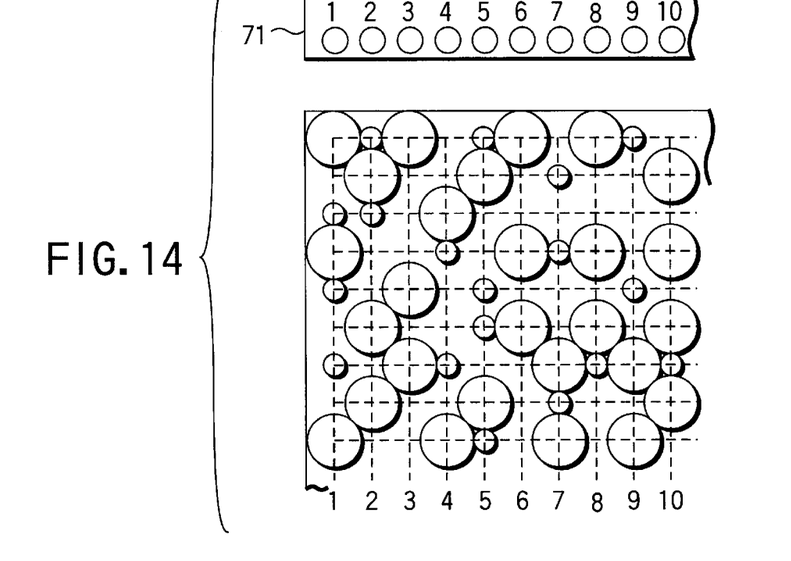
FIG. 14 is a view showing a printing example of a line recording head in a conventional art.

To the contrary, in the image forming apparatus provided with the line head mentioned above, in recent years, there is known a structure which can express one pixel at some steps of gradations by modulating a printing area within one pixel with using the multi-level image data generated by processing the input gradation image data according to the multi-level dither method. FIG. 14 shows a recording head 71 constituted by arranging a plurality of recording elements in a line, and a state of dots recorded by this recording head 71. In this drawing, there is shown for simplification an example of the case of recording one pixel by three values including white. In this case, by arranging, for example, four or three recording heads 71 mentioned above in parallel, it is possible to record a color image constituted by a combination of four colors comprising C (cyan), M (magenta), Y (yellow) and K (black), or a combination of three colors comprising C, M and Y.

In the image forming apparatus which can record the multi-level image data, in order to reproduce the predetermined number of gradations peculiar to a printer engine actually performing an image recording operation after executing various image processes such as a color conversion process, an under color removal (UCR) process or a γ correction, the structure is made such as to execute a multi-level halftone process such as a multi-level dither process employing a screen angle or a multi-level error diffusing process at each of colors so as to obtain the multi-level image data having some bits per one pixel. Then, it is intended to improve an image reproduction by concentrating more amount of information onto one pixel.

Further, the ordered dither process is generally light in processing, has a high speed and can reduce a cost, however, the error diffusing process is more excellent with respect to an image quality. However, in the case of the multi-level halftone process, a less difference in the image quality is generated in comparison with the case of two values. In particular, the more the number of gradation expressed by one pixel in a high resolution is, the smaller the difference of the image quality is.

In the multi-level dither process which is one of a multi-level halftone processes, there are two methods which are obtained by widely classifying according to a method of distributing a threshold value arrangement overriding each of planes. One is a method shown in FIG. 16A, that is, a method of filling up the threshold value in order of size from a smallest one at a unit of plane, and the other is a method shown in FIG. 16B, that is, a method of filling up the threshold value in order of size from a smallest one with respect to one optional pixel to be a subject to be processed.

Figure 15:
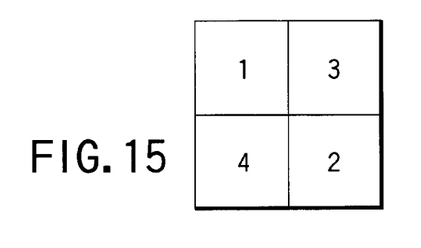
FIG. 15 is a view showing a basic dither matrix.
Figure 16A:
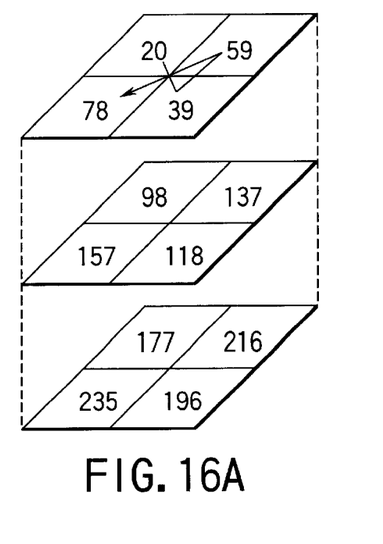
FIGS. 16A and 16B are views showing a concept of a multi-level dither process in the prior art.

For example, a multi-level dither process for converting image data of input 8 bits into an image having four values per one pixel (2 bits) according to the method shown in FIG. 16A by using a basic dither matrix of 2×2 shown in FIG. 15 is a dither process used for a printer such as an ink jet printer, which is basically hard to be influenced by an appearance of a dot of an adjacent pixel and can stably reproduce an image formation at each pixel. A resolution thereof is substantially the same as a resolution performance of the printer engine section. That is, it is an ideal method in the case that the resolution is very high, the dot density is high and the image is reproduced in a density modulation. In this case, since the image is easily reproduced on a whole of a screen at an pixel of the same size or the similar size, it is easily affected by a printing accuracy.

Figure 16B:
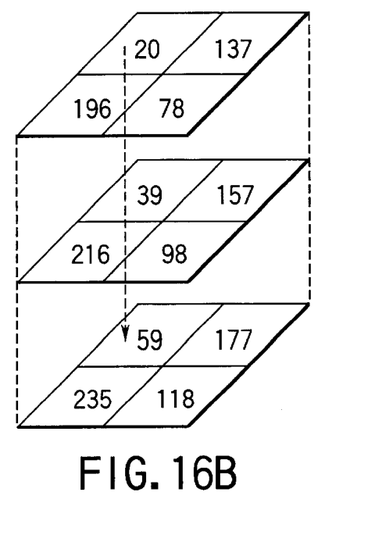

Further, a multi-level dither process for converting image data of input 8 bits into an image having four values per one pixel (2 bits) according to the method shown in FIG. 16B by using a basic dither matrix of 2×2 shown in FIG. 15 is a dither process frequently used for a printer such as a laser printer or a thermal printer, which is easily influenced by an appearance of a dot of an adjacent pixel and can be hard and unstable to form an image at each single pixel. A resolution thereof is low and a dot density is rough, and when setting a basic threshold value arrangement of the dither to a dot concentration type, an image called a dotted screen is formed. Since the resolution is low, a fine printing accuracy unevenness at a pixel unit is adsorbed.

To the contrary, with respect to a relationship between a recording head and a printing accuracy such as a printing position and a printing size, for example, in the case of the ink jet printer, a volume and a direction of an ink discharged from an ink discharge port corresponding to a recording element are in general frequently dispersed at each of ink discharge ports. It is possible to restrict the dispersion to a level equal to or less than a fixed value which generates no problem, however, a manufacturing cost becomes very expensive.

Further, in the case of forming an image at a high resolution equal to or more than an interval of the respective recording elements by scanning the head at plural times with changing a position in a raster direction, there is a possibility that a starting position for each of scanning is shifted, and a very high mechanical control is required for completely correcting this, so that it is a problem on cost.

When the volume and the direction of the ink are dispersed at each of the ink discharge ports, a density becomes higher at a portion having a large dot or a portion at which adjacent dots are closely arranged, in comparison with the other portion, whereby a density unevenness called as a black streak is generated, and further, a density becomes lower at a portion having a small dot and a portion at which adjacent dots are arranged apart from each other, in comparison with the other portions, whereby a density unevenness called as a white streak is generated. Accordingly, there is a problem that an image quality is deteriorated.

In order to prevent this, conventionally, the structure is made such that like a checkers-shaped thinned-out printing and the like, the same line in a direction perpendicular to the raster direction corresponding to a arranging direction of the respective recording elements of the ink jet head is not printed by the ink discharged from the same ink discharge port, but is printed by alternately using the inks discharged from a plurality of ink discharge ports, thereby preventing the density unevenness from generating. However, this method has a problem that a printing speed is low since a printing control is complicated.

Further, in the case of the image forming apparatus which employs the multi-level image data and can express one pixel at some stages of gradations by modulating the printing area within one pixel, there is a problem that a streak-shaped density unevenness is visually conspicuous particularly in the case of reproducing an image having a flat gradation on a whole surface at a dot of a medium size at which the adjacent dots are nearly brought into contact with each other. Particularly, in a human visual characteristic, there is a problem that a little positional shift is erroneously recognized as a streak-shaped density unevenness since a visual sensibility is very high in a horizontal direction and a vertical direction.

Further, there are various images printed by the printer, for example, there are a character/line image, a graph/CG, a photo image and the like. Optimum output systems for the respective images are different from each other, the character/line image emphasizing a resolution preferably employs a printing at higher resolution, the photo image emphasizing gradation preferably employs a printing which can obtain a more stable gradation reproducibility, and the graph/CG preferably employs a printing which has both of the high resolution and the stable gradation reproducibility.

In order to optimally print in this manner, there is conventionally known a method of switching contents of the halftone process according to the sort of the image. For example, Jpn. Pat. Appln. KOKAI Publication No. 9-233323 describes a structure which judges whether an image field of an input image is a character area or a pattern area and switches processes on the basis of the result between a two-value process according to a fixed threshold value having a priority to the resolution and a two-value process according to a dither process having a priority to the gradation.

Further, a structure described in Jpn. Pat. Appln. KOKAI Publication No. 10-191054 is made such as to judge after separating the input image into an area of an edge portion, an area adjacent to the edge and the other flat area, employ a dot dispersion type multi-level dither matrix for the area of the edge portion, employ a dot concentration type multi-level dither matrix for the flat area, and employ a multi-level dither matrix obtained by mixing the dot dispersion type and the dot concentration type for the area adjacent to the edge, thereby performing the multi-level dither process.

However, the structure described in Jpn. Pat. Appln. KOKAI Publication No. 9-233323 is made such as to switch the method of forming two values on the basis of the image field discrimination, and accordingly there is a problem that it can not process the multi-level output. Further, since the structure in Jpn. Pat. Appln. KOKAI Publication No. 10-191054 basically switch the sort of the basic dither matrix at the switching portion of the area, there is a problem that it is impossible to sufficiently delete a transient discontinuity of the image. Further, there is a problem that the process is made complex.

BRIEF SUMMARY OF THE INVENTION

An object of the present invention is to provide an image processing method which can perform a multi-level dither process with keeping a sufficient resolution in the case that an input gradation image data is an image such as a character/line image setting a resolution as import and with keeping a sufficient gradation reproducibility in the case that it is an image such as a photo image emphasizing a gradation, and an image processing apparatus.

Further, according to the method and the apparatus, it is possible to sufficiently secure a continuity of an image on a boundary of the sorts of images.

In accordance with the present invention, there is provided an image processing method comprising the steps of: storing a plurality of multi-level dither threshold value arrangements employed for a multi-level dither process; discriminating a given first gradation image data expressing one pixel by a first bit number into an image field emphasizing a resolution and an image field emphasizing a gradation; selecting an optimum multi-level dither threshold value arrangement from a plurality of multi-level dither threshold value arrangements stored in the storing step on the basis of a discrimination result by the discriminating step; and converting the gradation image data into a second gradation image data expressing one pixel by a second bit number less than the first bit number according to a multi-level dither process on the basis of the optimum multi-level dither threshold value arrangement selected by the selecting step.

The present invention is structured, as mentioned above, such that a multiplicity of multi-level dither threshold values for the multi-level dither process are previously prepared, and the multi-level dither process is performed on the basis of the selected arrangement, for example, the multi-level dither threshold value arrangement emphasizing a resolution is selected for the character and line areas which require the resolution and the multi-level dither threshold value arrangement emphasizing a gradation is selected for the photo image field which requires the gradation. Accordingly, it is possible to perform the optimum multi-level dither process according to the field characteristics.

Further, since the same basic dither matrix is used even when the sort of the image field is replaced, a great strain which was generated in the conventional apparatus is not generated on the image even when the field discrimination is erroneously performed.

Further, the operation and effect of the present invention are also generated in an image processing apparatus employing the method according to the present invention for the same reason.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment according to the present invention will be described below with reference to the accompanying drawings. In this case, the embodiment is mentioned as a structure obtained by applying the present invention to a color ink jet printer.

Figure 1:
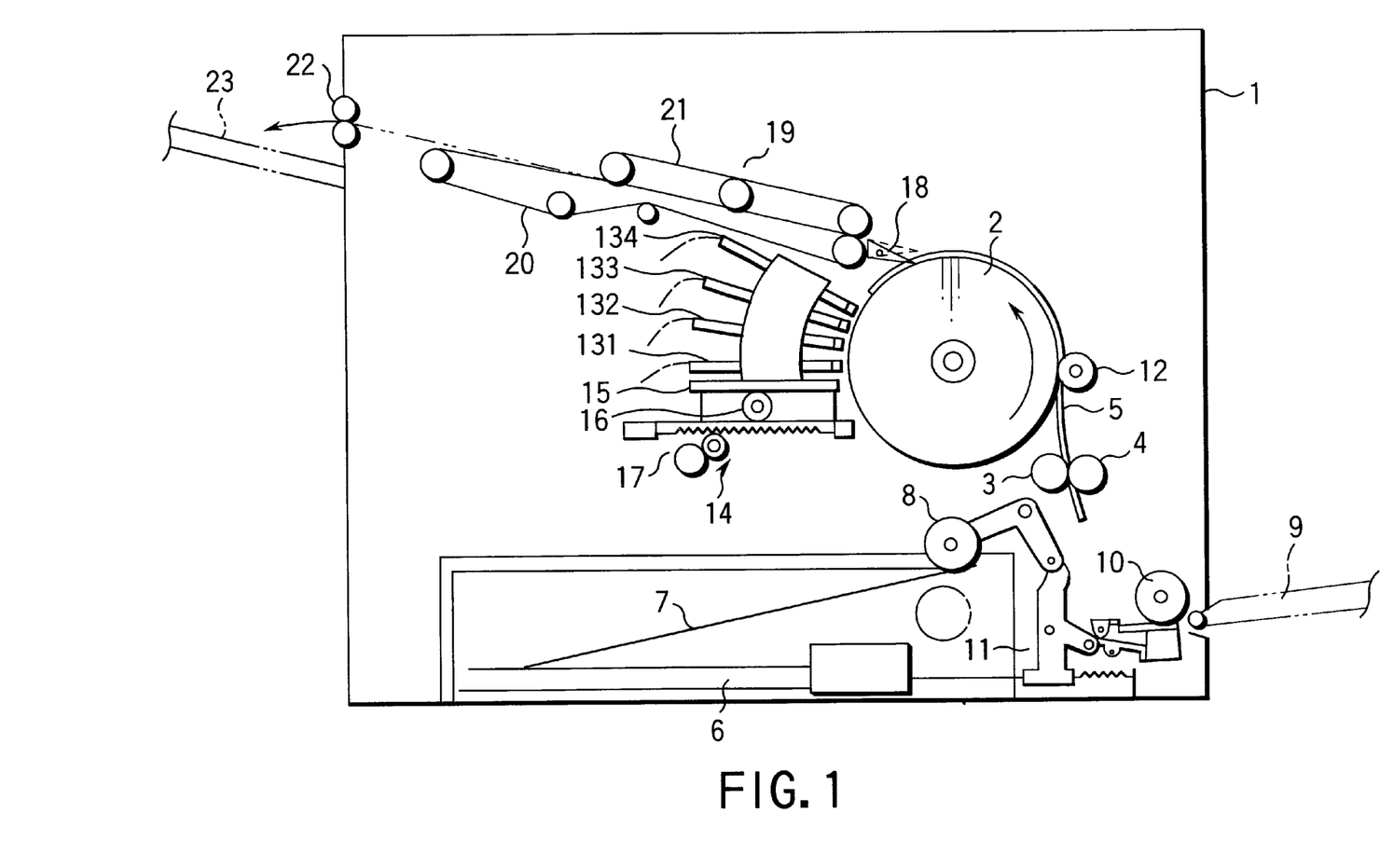
FIG. 1 is a schematic view of a whole of a printer showing an embodiment according to the present invention.

FIG. 1 is a view showing a structure of a main portion of a printer. The structure is made such that a rotary drum 2 rotating at a fixed peripheral speed in a direction shown by an arrow in FIG. 1 is provided within a main body case 1 and a recording sheet 5 fed by sheet supply rollers 3 and 4 is wound around the rotary drum 2.

That is, the structure is made such that a sheet supply cassette 6 is provided in a bottom portion of the main body case 1, the recording sheets 5 are layered and mounted on a mounting plate 7 of the sheet supply cassette 6, and the layered and mounted recording sheets 5 are taken out one by one by a supply roller 8 so as to feed to the sheet supply rollers 3 and 4. Further, the structure is made such as to feed the recording sheet 5 manually inserted from a manual inserting tray 9 mounted to a side portion of the main body case 1 so as to freely open and close to the sheet supply rollers 3 and 4 by a supply roller 10. The supplying operation by the supply roller 8 and the supply operation by the supply roller 10 are switched by a supply switching section 11.

A charging roller 12 for adsorbing the recording sheet 5 supplied from the supply rollers 3 and 4 onto a drum surface is arranged in the rotary drum 2 in an opposing manner. Further, in the rotary drum 2, there is provided a printing mechanism 14 constituted by arranging four ink jet recording heads 131, 132, 133 and 134 having a multiplicity of ink discharge ports corresponding to recording elements arranged in a line in an opposing manner so as to freely move in a direction of an axis of rotation of the rotary drum 2. The respective recording heads 131 to 134 correspond to a yellow ink jet recording head 131 which injects a yellow (Y) ink, a cyan ink jet recording head 132 which injects a cyan (C) ink, a magenta ink jet recording head 133 which injects a magenta (M) ink and a black ink jet recording head 134 which injects a black (K) ink, respectively.

The printing mechanism 14 is provided with a reciprocating mechanism 15 which mounts the recording heads 131 to 134, a motor unit 16 having a reciprocating rod and a linear motor and a forward/backward moving section 17, thereby controlling to move forward/backward the recording heads 131 to 134 with respect to the rotary drum 2 by the forward and backward moving section 17 and move the reciprocating mechanism 15 in a direction of the axis of rotation of the rotary drum 2 by the motor unit 16 so as to reciprocate the recording heads 131 to 134 in a direction of the axis of rotation of the rotary drum 2.

Further, a recording sheet peeling section having a peeling pawl 18 capable of being inserted between the drum surface and the recording sheet 5 is arranged in the rotary drum 2, thereby discharging the recording sheet 5 peeled by the peeling pawl 18 to a recording sheet discharging/feeding section 19. The recording sheet discharging/feeding section 19 is constituted by a belt conveyor 20 brought into contact with a non-recorded surface of the recording sheet 5 and a pressing section 21 pressing the recording sheet 5 to a surface of the belt conveyor 20.

A sheet discharging roller 22 is mounted to a terminal end portion of the belt conveyor 20, thereby discharging the recording sheet 5 fed by the belt conveyor 20 to a discharge tray 23 provided on a side surface of the main body case 1 via the sheet discharging roller 22.

Figure 2:
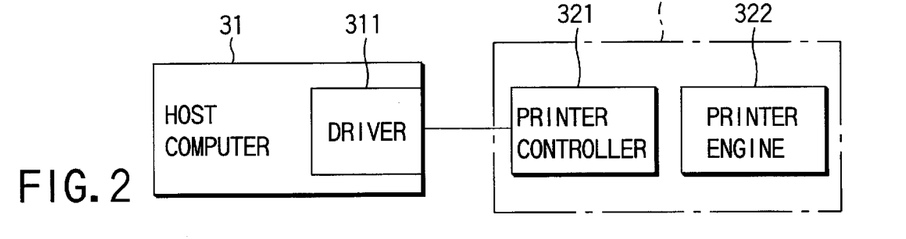
FIG. 2 is a block diagram showing a structure of a whole hard ware in the embodiment.

FIG. 2 is a block diagram showing a structure of a hard ware of the whole of the apparatus. The structure is made such as to transfer the image data from a host computer 31 to a printer 32. That is, the host computer 31 is structured such as to transfer data of a code or a raster from a driver 311 to a printer controller 321 of the printer 32 according to an interface characteristic with the printer 32.

The printer 32 is structured such as to drive and control a printer engine 322 by the printer controller 321. The printer engine 322 is constituted by the rotary drum 2, the sheet supply mechanism comprising the sheet supply rollers 3 and 4, the sheet cassette 6 and the like, the charging roller 12, the printing mechanism 14 provided with the ink jet recording heads 131 to 134, the recording sheet discharging/feeding section 19 and the like.

The printer controller 321 develops coded image data fed from the host computer 31, for example, page description languages such as PDL to a bit map and performs respective image processes, and thereafter stores them in a built-in page memory. The printer engine 322 converts the image data of the bit map from the printer controller 321 into a drive signal and drives the rotary drum 2, the sheet supply mechanism, the charging roller 12, the respective recording heads 131 to 134 and the like in a predetermined order.

In this case, it is not necessary that the host computer 31 and the printer 32 always satisfy a relationship of one to one, the printer may be employed as a network printer for a recently spreading network, in this case, it is in a relationship of plural numbers to one. Further, an interface between the printer controller 321 and the printer engine 322 is basically dependent upon an architecture of the printer and is not defined.

Figure 3:
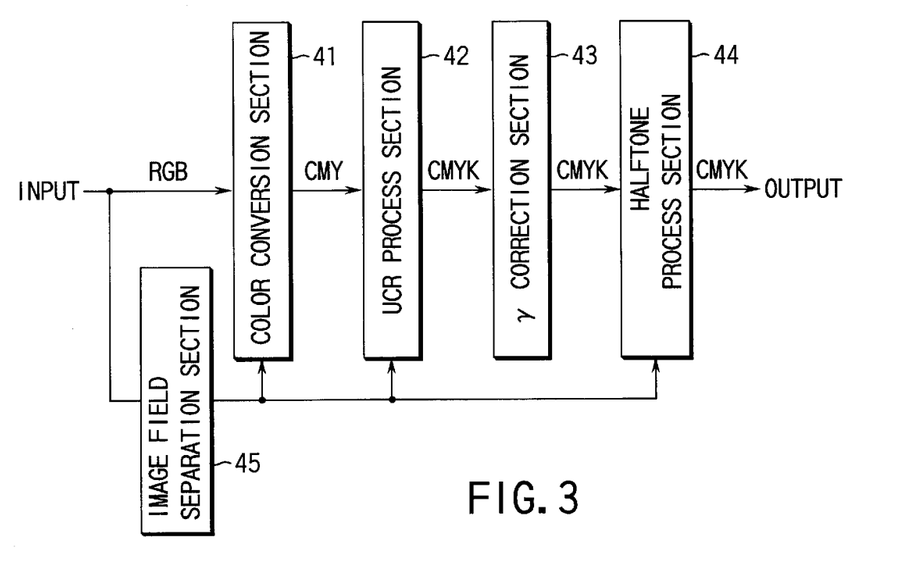
FIG. 3 is a block diagram showing a structure of an image processing section of a printer controller in the embodiment.

FIG. 3 is a block diagram showing a structure of an image processing section within the printer controller 321. The image processing section is constituted by a color conversion section 41, a UCR process section 42, a γ correction section 43, a halftone process section 44 performing a halftone process and an image field separation section 45 performing a field discrimination, and for example, at first converts an input RGB color signal which is standard in a monitor of 8 bits in respective colors into a CMY color signal corresponding to reproduced colors in the printer 32 by the color conversion section 41.

Next, the UCR process section 42 extracts a black component from the CMY color, determines the later CMY color and finally converts into a CMYK color. Next, the γ correction section 43 performs a density correction according to an actual printing characteristic of the printer 32. Then, the halftone process section 44 compresses the data of one pixel to data of about 2 to 4 bits in respective colors according to a printing capacity of the printer 32, according to the multi-level dither process at respective colors.

Further, the image field separation section 45 is structured, for example, such as to perform an image field separation at one pixel unit or a block unit or an object unit from an information of a G component of the input RGB signal and to reflect the result in the color conversion process section 41, the UCR process section 42 and the halftone process section 44. An output of the image field separation section 45 can respond to four kinds of image by 2 bits.

Figure 4:
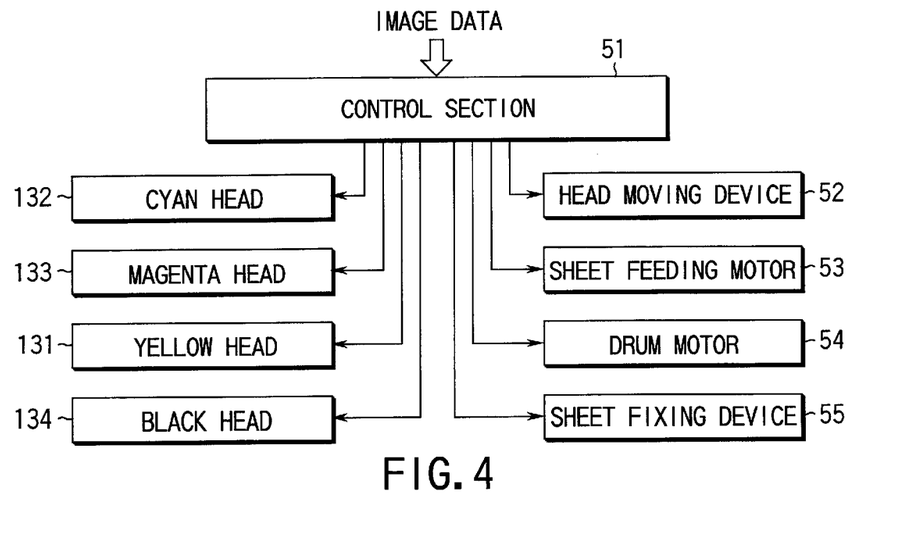
FIG. 4 is a block diagram showing a structure of a hard ware of a printer engine in the embodiment.

FIG. 4 is a block diagram showing a hard ware structure of the printer engine 322. The structure thereof is made such that a control section 51 is provided, and the control section 51 drives and controls the respective recording heads 131 to 134 according to the image data from the printer controller 321 and drives and controls a head moving device 52 comprising the reciprocating mechanism 15 and the motor unit 16, a sheet feeding motor 53 which rotates the sheet supply roller 3, 4 and the like, a drum motor 54 which rotates and drives the rotary drum 2, and a sheet fixing device 55 comprising the charging roller 12 which fixes the fed recording sheet 55 to the rotary drum 2.

The head moving device 52 moves the respective recording heads 131 to 134 at a predetermined speed and timing in a direction of an axis of rotation of the rotary drum 2 in synchronous with the printing. The sheet feeding motor 53 feeds and controls the recording sheet 5 picked up from the sheet supply cassette 6 to the rotary drum 2. In this case, another motor discharges the recording sheet 5 after being printed and peeled out, to the recording sheet discharging/feeding section 19 and the like.

The halftone process section 44 and the image field separation section 45 constitute a main portion of the present invention, and a function of this process section will be described, for example, with reference to the case of applying a halftone process to image data of input 8 bits and 256 gradation (0: white, 255: black) so as to convert into respective colors of 3 bits and 8 gradation (0: white, 7: black).

Figure 5:
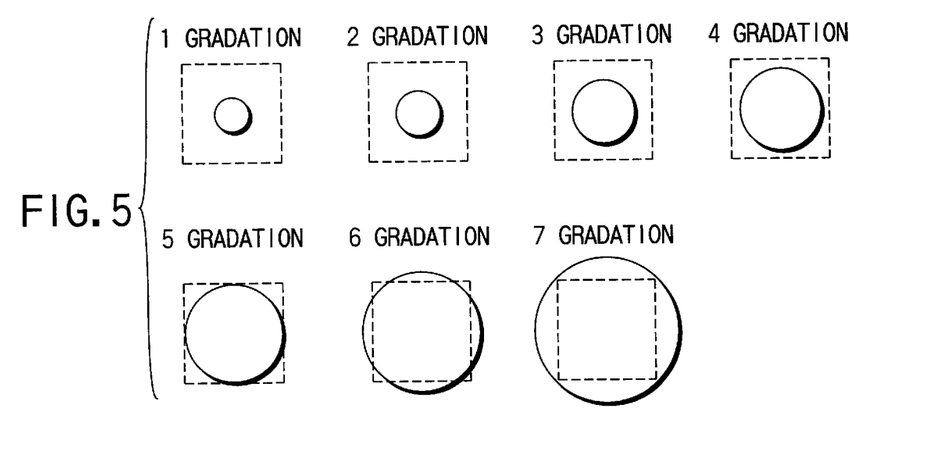
FIG. 5 is a view showing a pixel size at every gradations in the embodiment.

In the case that the image of respective color 3 bits can be processed as a capacity of the printer 32, for example, it is possible to obtain multi-level image data of respective color 3 bits according to the halftone process. As shown FIG. 5, this can totally reproduce 8 gradations including white within one pixel with using 7 sorts of changeable dot sizes at respective colors per one pixel. Further, the sizes of the respective dots in the respective gradations are generally previously adjusted at respective colors so as to become in a linear characteristic and the like in a density manner. Further, the dot size of the maximum gradient, that is, 7 gradation becomes a circle which completely covers a regular rectangular pixel of a pure resolution in the printer engine 322.

Figure 6:
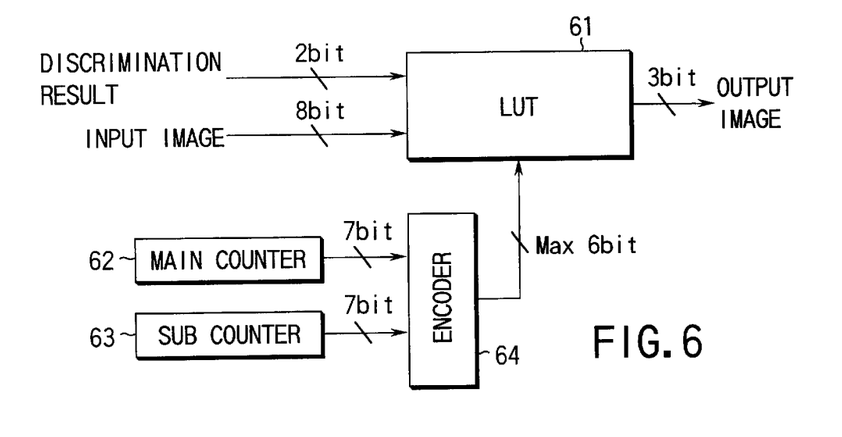
FIG. 6 is a block view showing a structural example of a halftone process section in the embodiment.

FIG. 6 shows a specific structure of the halftone process section 44 and shows a block for performing a multi-level dither process. The block is constituted by a look-up table (LUT) 61, a main counter 62, a sub counter 63 and an encoder 64.

The main counter 62 is structured such as to periodically count at an optional fixed bit number in a main scanning direction, and a size thereof is set to a size in the main scanning direction in the case of expanding the basic matrix including a screen angle so as to form a regular rectangle. The sub counter 63 is structured such as to periodically count at an optional fixed bit number in a sub scanning direction, and a size thereof is set to a size in the sub scanning direction in the case of expanding the basic matrix including a screen angle so as to form a regular rectangle. In this case, they correspond to a period before 128 pixel count in the scanning direction and 128 pixel count in the sub scanning direction.

The encoder 64 outputs a certain encoded code of 6 bits at maximum on the basis of a dither threshold value row of a multi planes corresponding to a position of a counted value from the counted value input from the main counter 62 and the sub counter 63. It is set to 6 bits at maximum because the maximum number x of a threshold value which can realize the maximum reproduction gradation number not over 256 gradations in the multi-level dither process is expressed by the formula $255/\{xx(8-1)+1\} \geq 1$, so $x \geq 36$ when the input gradation image data is 8 bits and 256 gradations and becomes 3 bits and 8 gradations after the halftone process, so that a reproduction of the halftone process up to 256 gradations which is necessary for the multi-level dither process can be covered by 6 bits at maximum. The hardware structure of the encoder 64 can be easily realized by a RAM and the like.

The LUT 61 is structured such as to output a conversion result according to an actual multi-level dither process at 3 bits and 8 gradations on the basis of the coded data of 6 bits at maximum, the input gradation image data of 8 bits and 256 gradations and the discrimination result from the image field separation section 45. The hardware structure of the LUT 61 can be also easily realized by the RAM and the like.

In accordance with the structure mentioned above, it is possible to express the input gradation image data of 8 bits and 256 gradations per one pixel at a pseudo halftone of 3 bits and between 8 gradations and 256 gradations per one pixel according to a multi-level dither process. Further, when the LUT 61 and the encoder 64 are constituted by the RAM, the multi-level dither process having an optional threshold value arrangement can be performed by loading an optional conversion pattern before performing the halftone process.

Figure 17:
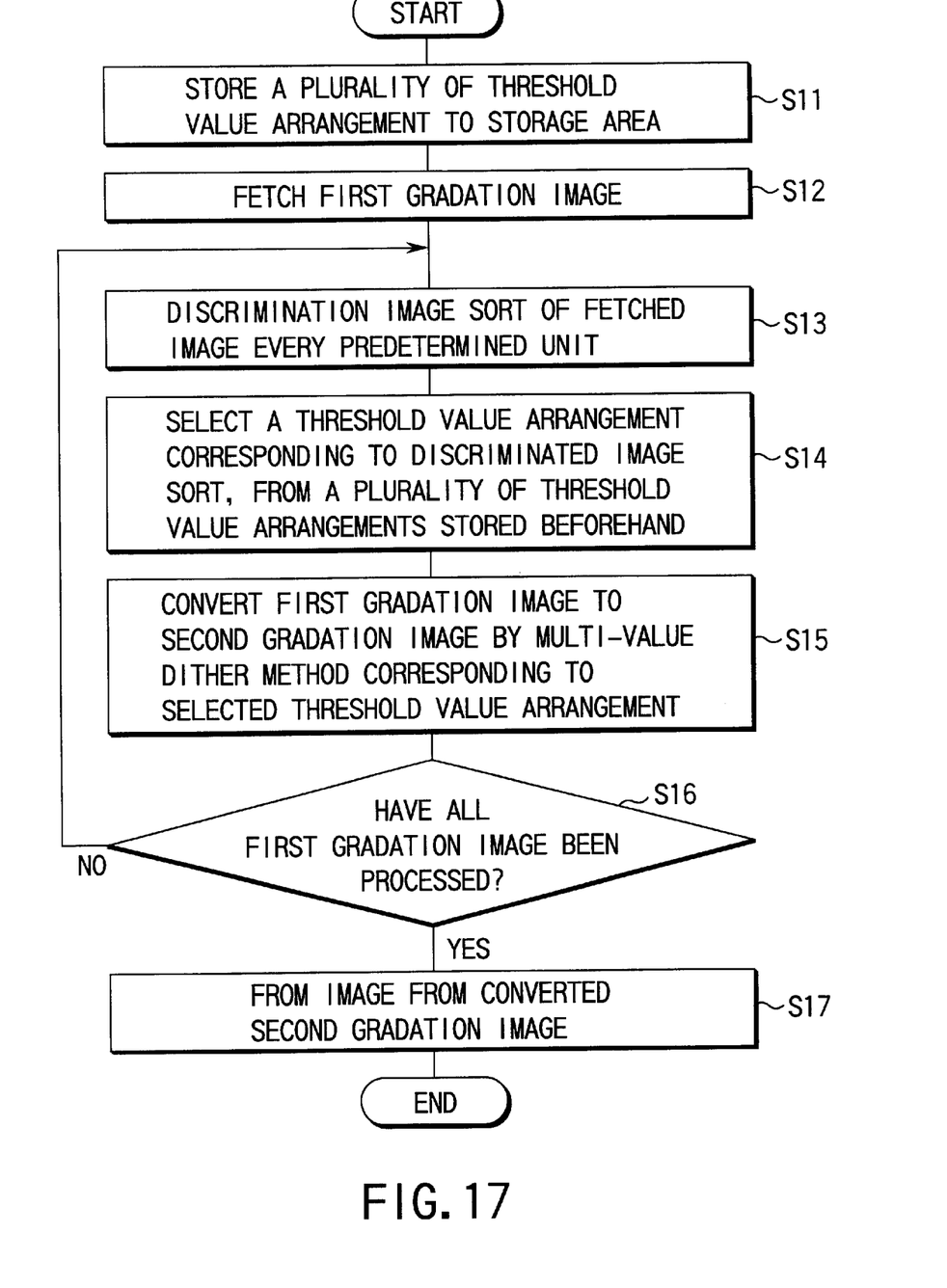
FIG. 17 is a flowchart showing an operation of the multi-level dither process according to the present invention.

Next, a description will be given below of a multi-level dither process employing a plurality of threshold value arrangements corresponding to the feature of the present invention with reference to a flowchart. FIG. 17 is a flowchart showing an operation of the multi-level dither process according to the present invention.

At first, in order to respond to a specific requirement of a multiplicity of image field sorts, a plurality of multi-level dither threshold value arrangements for a multi-level dither process are stored in the storage area (S11). Then, a multi-level gradation image given from an outer portion is fetched (S12). With respect to the fetched multi-level gradation image, an image field sort at each of predetermined units (a pixel unit, a block unit or an object unit) is discriminated (S13). Then, according to the discriminated image field sort, an optimum multi-level dither threshold value arrangement from a plurality of multi-level dither threshold value arrangements previously stored in the storing field is selected (S14). In correspondence to the selected threshold value arrangement, the multi-level dither process is applied to the given multi-level gradation image so as to convert to a multi-level gradation image expressed by the bit number different from the first multi-level gradation image (S15). Continuously performing the processes mentioned above and completing all the gradation image (S16), then if the apparatus is the image forming apparatus, an image formation on the basis of the converted gradation image with using the printer section and the like is performed (S17).

As mentioned above, according to the present invention, since the optimum one is selected by differentiating the threshold value arrangement of the multi-level dither process according to the image sort, for example, the character and line image requiring the resolution can obtain a clear image, and the photo image requiring the gradation keeps a sufficient gradation.

Figure 7A:
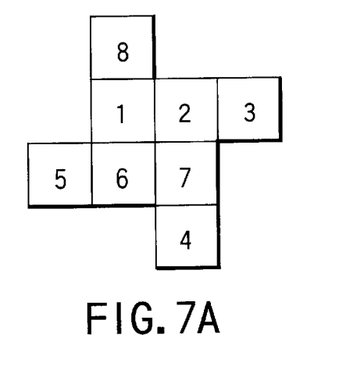
FIG. 7A is a view of a basic dither matrix in the embodiment.

Next, a description will be given of the multi-level dither process. FIG. 7A shows a basic dither matrix, which is set to a screw type dither matrix having a general 45 degrees of screen angle for making an explanation simple. The pseudo halftone reproduction number in this case is 57 gradations obtained by the formula 8×(8−1)+1=57. This gradation number is less than an original one, however, a description will be given on the basis of the gradation number for making the description simple. In this case, even when the gradation number is increased, a basic process method is not changed.

Figure 7B:
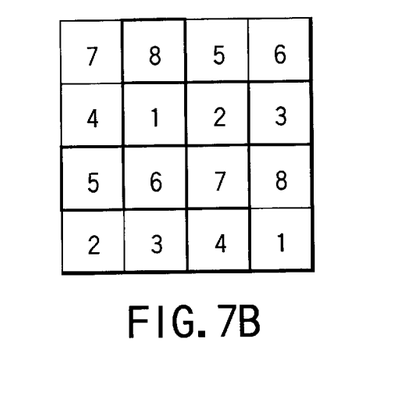
FIG. 7B is a view of a basic dither matrix expanded in a regular rectangular manner in the embodiment.

In the reference threshold value of the basic dither matrix shown in FIG. 7A, in the case of expanding it to a regular rectangular lattice, it becomes as shown in FIG. 7B. The bit numbers of the main counter 62 and the sub counter 63 are both 2 bits, and the multi-level dither process is applied to it in the LUT section 61 according to the 3 bit data encoded in the encoder 64 and the input gradation image data so as to output as the image data of 3 bits.

Figure 8A:
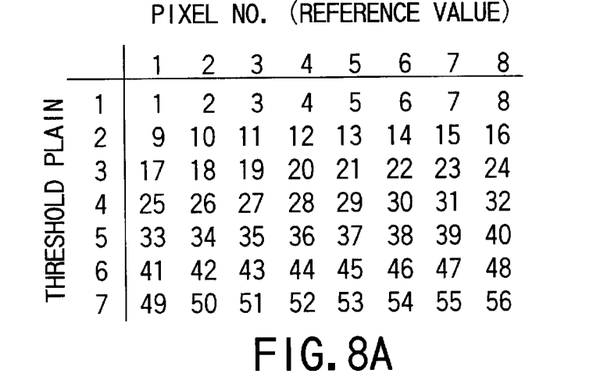
FIGS. 8A to 8C are views for explaining a concept of a multi-level dither process in the embodiment.
Figure 8B:
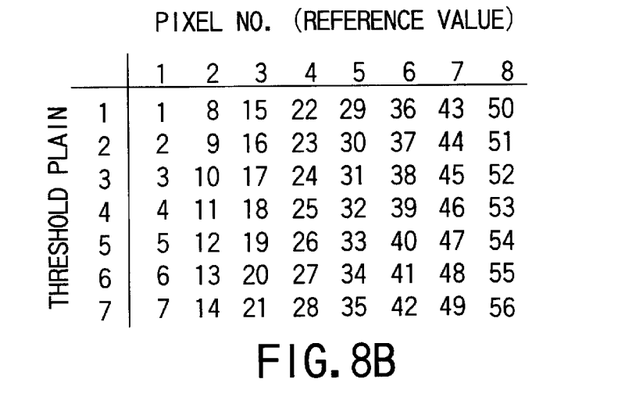
Figure 8C:
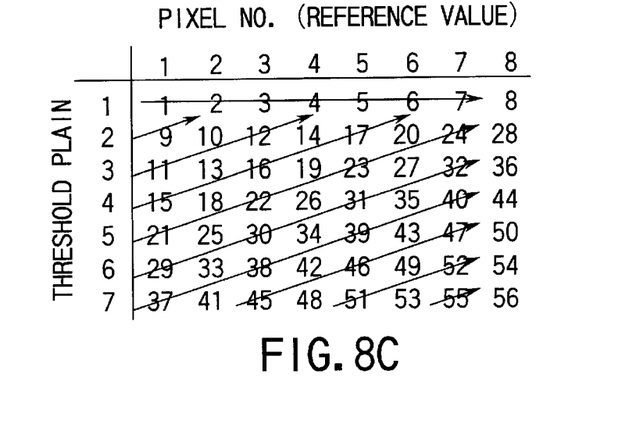

An actual threshold value arrangement in the case of using FIG. 7A as the basic threshold value will be shown in FIGS. 8A to 8C. This threshold value is between 0 and 255 and is not normalized, and is expressed by a simple continuous order on the basis of the size of the threshold values. A pixel No. corresponds to the reference threshold value of the basic dither matrix in FIG. 7A.

FIG. 8A shows the same threshold value arrangement as that of FIG. 16A. This is an ideal threshold value arrangement, however, there is generated a problem that it is easily affected by the printing accuracy and a density unevenness and a vertical streak are conspicuous. Further, FIG. 8B shows the same threshold value arrangement as that of FIG. 16B. This can restrict conspicuousness of the density unevenness and the vertical streak caused by the engine accuracy, however, there is generated a problem that the resolution is lowered. FIG. 8C shows a threshold value arrangement having an intermediate characteristic.

Figure 8D:
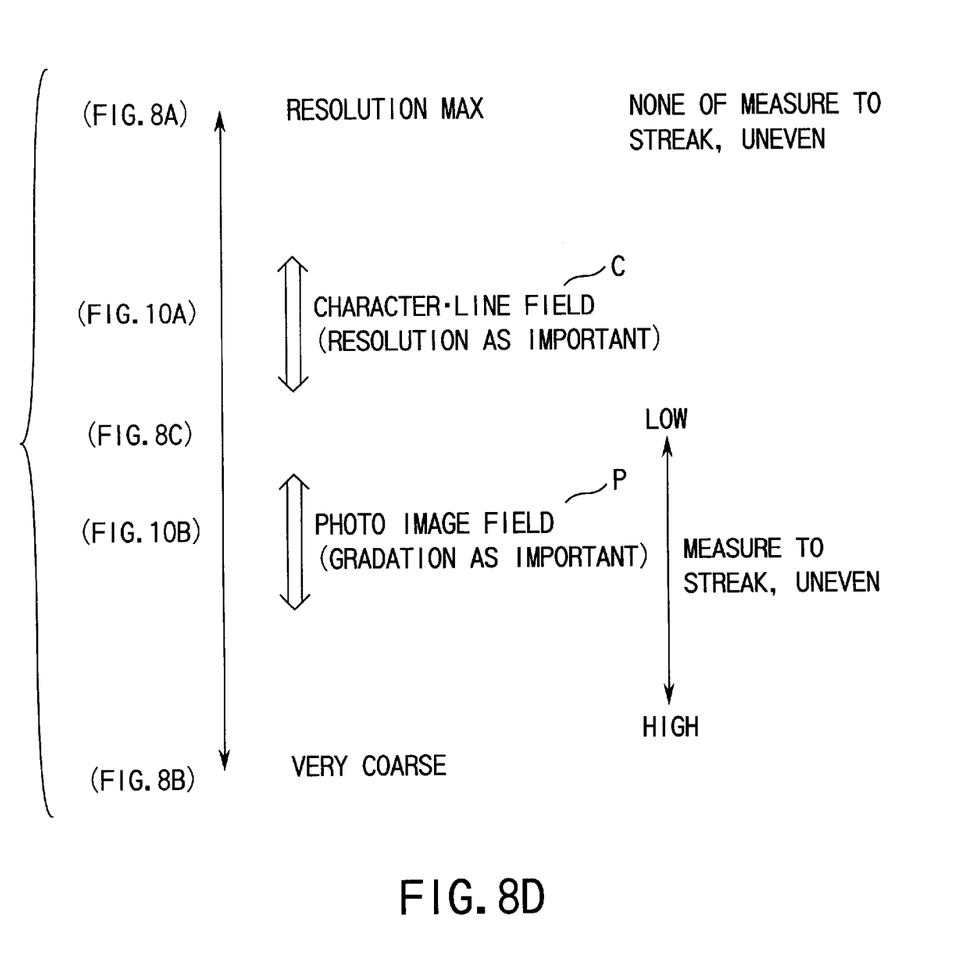
FIG. 8D is a explanatory view showing a use of a rearrangement of multi-level dither threshold value arrangements which is a feature of the present invention.

Further, FIG. 8D is an explanatory view for understandably explaining the feature of the present invention employing a plurality of threshold value arrangements, which explains that it is considered that the infinite number of threshold value arrangements exist between the threshold value arrangements in FIGS. 8A and 8B. The threshold value arrangements mentioned above include, for example, one shown in FIG. 8C and ones shown in FIGS. 10A and 10B mentioned below, and the respective arrangements have a little characteristic required by the respective image field sorts.

That is, in FIG. 8A, the resolution becomes maximum, however, no measure to the streak and the unevenness appearing on the printing surface is set, so that it is not proper to use the arrangement as it is for the character/line image field and the photo image field. Further, in FIG. 8B, the resolution is deteriorated, and the screen becomes much coarse, so that it is not proper to use the arrangement for the character and line image and the photo image.

Figure 10A:
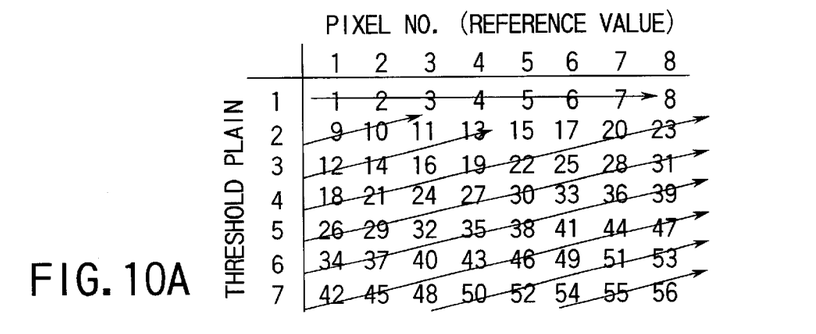
FIGS. 10A to 10D are views showing examples of the multi-level dither threshold value arrangement which the halftone process section in the embodiment uses.

For example, in the character/line image field C, the resolution is considered to be most important and it is considered that a certain measure to the streak and the unevenness is good, so that it is considered that the threshold value arrangement in FIG. 10A is best.

Figure 10B:
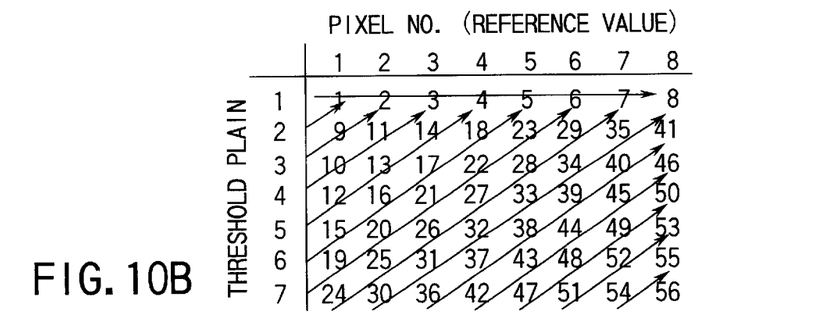

Further, since the gradation is considered to be most important in the photo image field P, the measure to the streak and the unevenness is sufficiently considered and further a certain resolution is required, so that the threshold value arrangement in FIG. 10B is considered to be best, for example.

As mentioned above, it is possible to establish, for example, both of a certain resolution in the character and line image and a certain gradation (including an effect of restricting the streak and the unevenness) in the photo image by the multi-level dither process on the basis of the optimum threshold value arrangement according to the image field sort of the present invention.

Figure 9A:
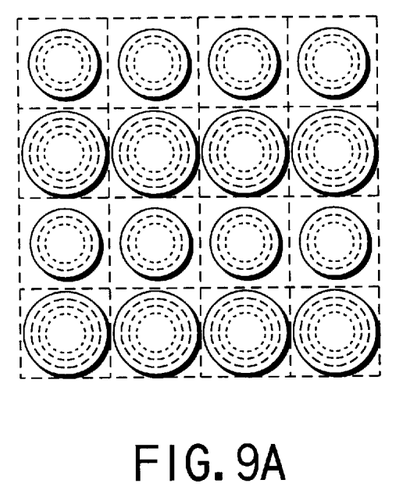
FIGS. 9A to 9C are views showing printing examples when printing with using the multi-level dither threshold value arrangements in FIGS. 8A to 8C.
Figure 9B:
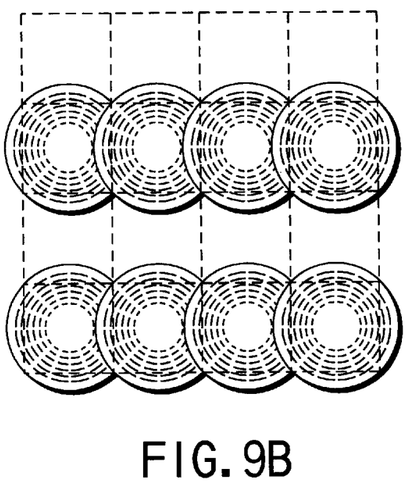
Figure 9C:
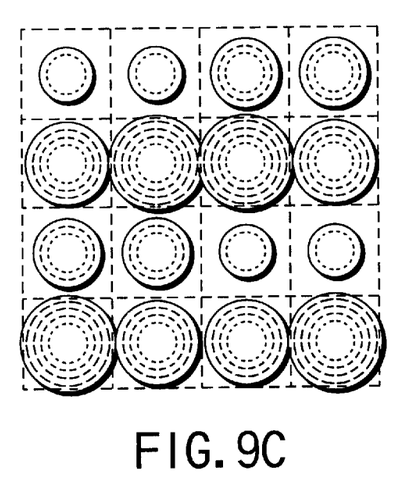

FIGS. 9A to 9C show printing examples of the multi-level dither processes according to FIGS. 8A to 8C when using the basic dither matrix in FIG. 7A in an even halftone on a whole surface. That is, FIG. 9A shows a printing result according to FIG. 8A, FIG. 9B shows a printing result according to FIG. 8B and FIG. 9C shows a printing result according to FIG. 8C.

Then, in this embodiment, as shown in FIG. 8C, the structure is made such as to orderly fill the threshold value arrangement in a zigzag manner in a oblique direction to the direction of the pixel No. and the direction of the threshold value plane corresponding to the reference threshold value. Further, with respect to the image reproduced by the input image of 0 to 20%, since it is known that the density unevenness and the vertical streak are not conspicuous due to the fact that the size of the pixel to be constructed is smaller than the pitch interval between the adjacent pixels, the dither threshold value arrangement of the threshold value plane "1" in FIG. 8C is set to the dither threshold value arrangement having the same structure as that of the threshold value plane "1" in FIG. 8A so as to increase the spatial frequency with respect to the input image within the range. By setting the threshold value arrangement mentioned above, the pixel in the low density portion (a highlight portion) which is a very important element for reproducing the gradation of the printer can be made inconspicuous and the gradation reproducibility can be improved.

Further, since there is a regularity as is different from the case of arranging the threshold values at random, it is possible to automatically determine the threshold values of the respective planes from the basic dither matrix as far as it is possible to know the parameters such as an angle in the oblique direction and a starting position, so that it is possible to realize a compact hardware.

Further, a method of reproducing an optimum gradation according to the image sort is solved by combining the dither threshold value arrangements. That is, a plural sets of dither threshold value arrangements as shown in FIG. 8C are prepared in a manner of differentiating the incline angle of the arrangement order, one dither threshold value arrangement is selected among them according to the sort of the image which the image field separation section 45 discriminates, and the result obtained by the halftone process is output according to the selected dither threshold value arrangement.

Specifically speaking, there can be considered various kinds of methods of filling the threshold value arrangement with respect to the oblique direction, however, examples of the multi-level dither threshold value arrangements having four kinds of angles in the oblique direction are shown in FIGS. 10A to 10D. FIG. 10A shows an example of a threshold value arrangement in the case of laying an angle most among three multi-level dither threshold value arrangements, in this case, the spatial frequency becomes high, the substantial resolution becomes high and the density unevenness and the vertical streak are easily visible. However, in the nearly rush character/line images, since the dots are overlapped with each other, the density unevenness and the vertical streak are hard to be visible. Further, when setting the angle of laying the threshold value arrangement to 0 degree, it becomes equivalent to that in FIG. 8A.

Figure 10C:
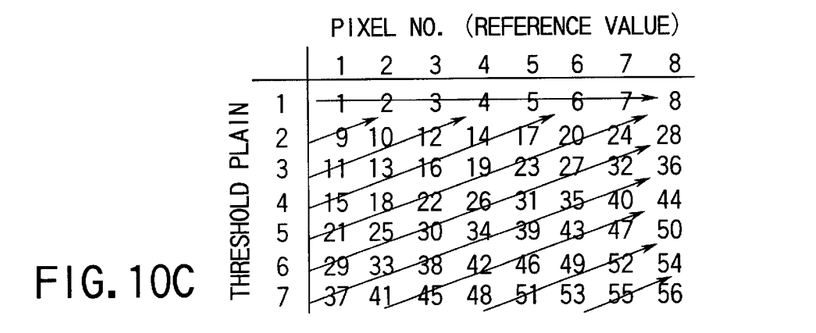

FIG. 10B shows an example of a threshold value arrangement in the case of standing an angle most among three multi-level dither threshold value arrangements, in this case, the image is going to be formed in a direction that the resolution is deteriorated, however, becomes strong to the density unevenness and the vertical streak of the image, so that a stable resolution can be reproduced. Further, when setting the angle of laying the threshold value arrangement to 90 degree, it becomes equivalent to that in FIG. 8B. FIG. 10C shows an example of setting the laying angle to a level between those in FIGS. 10A and 10B. An output characteristic in this case becomes an intermediate characteristics between those in FIGS. 10A and 10B, is strong to the density unevenness and the vertical streak of the image at a certain degree, and can keep a certain level of resolution.

Accordingly, with respect to the input gradation image data, the image field separation section 45 discriminates whether the image is in the character/line image field emphasizing a resolution or the photo image field emphasizing a gradation, and on the basis of the discrimination result, selects the multi-level dither threshold value arrangement used by the halftone process section 44 so that the laying angle becomes optimum. That is, with respect to the character/line image emphasizing a resolution, it selects the multi-level dither threshold value arrangement shown in FIG. 10A so as to perform the halftone process, and with respect to the image field of the photo image emphasizing the gradation, it selects the multi-level dither threshold value arrangement shown in FIG. 10B so as to perform the halftone process. In this case, the character/line image field includes an edge component in a high frequency field contained in the photo image or the halftone character/line image which is reproduced by the printer copier and the like as well as the normal character/line image field.

The image field separation section 45 is structured such as to discriminate a sort of the image by basically detecting the edge component of the image, in this case, the G component in the RGB component is used for the image to be detected, however, it is not limited to this. An edge detection is performed at one pixel unit or a block unit or an object unit. This can be realized since a discontinuity is cancelled by the different halftone process on the boundary of the field whatever range the image field separation is performed.

The structure of the image field separation section 45 is not particularly limited, whatever realizing method may be employed. For example, in the image field separation process, there is a case that an accuracy of discrimination becomes a problem due to a technique of the processing method. This is a case that an image deterioration becomes a problem due to an improper halftone process caused by an erroneous discrimination.

However, in the present invention, as is different from the conventional apparatus, since an absolute designating position (the basic dither matrix) of the reference threshold value arrangement in the halftone process is not changed even in the boundary of the respective image field, a continuity of the image is compensated. Accordingly, the significant image deterioration is not generated by a sudden change (noise) of the screen on the basis of a little erroneous discrimination in the image field of the screen in the conventional apparatus.

Figures 11A, 11B, 12:
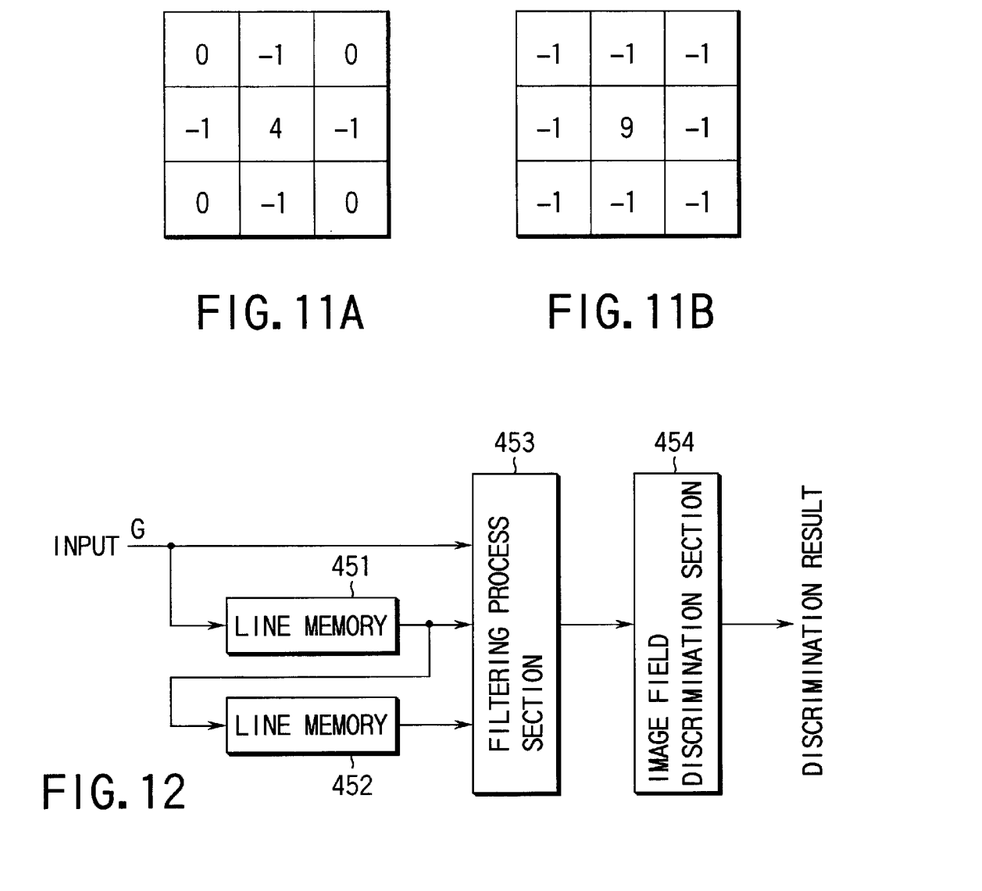
FIGS. 11A and 11B are views showing filter examples when an image field separation section in the embodiment discriminates a sort of the image with using an edge detecting filter.
FIG. 12 is a block diagram showing a specific structure when the image field separation section in the embodiment discriminates an image field at one pixel.

In the case that the image field separation section 45 performs the image field discrimination at one pixel unit, the sort of the image is discriminated by using a simple edge detecting filter as shown in FIGS. 11A and 11B which is generally known. A specific structure of the image field separation section 45 at this time is shown in FIG. 12. That is, it is structure such as to provide with a pair of line memories 451 and 452, a filtering process section 453 and an image field discrimination section 454, supply a G component of the RGB component in the input gradation image data to the line memory 451 and the filtering process section 453, and perform a filtering process in the filtering process section 453 with using the edge filter shown in FIG. 11A or 11B, and the image field discrimination section 454 discriminates whether the sort of the image is in the character/line image field or the photo image field on the basis of the result, and outputs the discrimination result.

In this case, the sort of the image is not limited to two sorts comprising the character/line image field and the photo image field, and the structure may be made such as to discriminate three kinds of images comprising the character/line image field, the photo image field and the intermediate field. When this case is mentioned according to, for example, FIGS. 10A, 10B and 10C, FIG. 10A is employed with respect to the character/line image field, FIG. 10B is employed with respect to the photo image field and FIG. 10C is employed with respect to the intermediate field.

Figure 10D:
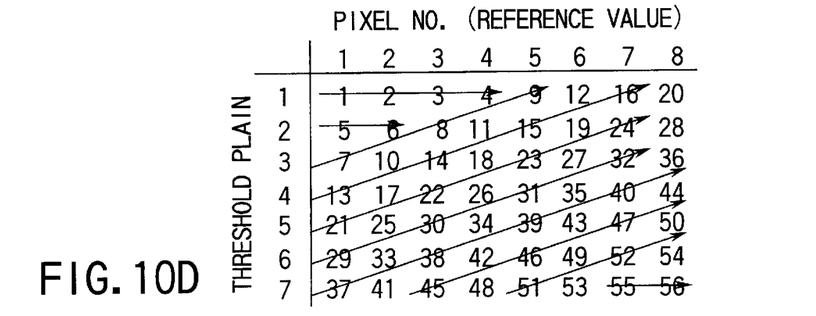

Further, the threshold value arrangement is not limited to that mentioned above, various kinds can be considered within the desired range, for example, it is possible to employ the threshold value arrangement shown in FIG. 10D in the same manner.

Further, in the case that the image field separation section 45 performs the image field discrimination at a block unit of P pixel×Q pixel (wherein, P, Q>2), the filter method is employed in the same manner as the case of discriminating at the pixel unit mentioned above, and it is possible to employ various kinds of methods such as a method of expanding this at a block unit, a method of determining this from a standard deviation of the pixel data within the block and the like.

Further, in the case that the image field separation section 45 performs the image field discrimination at the object unit such as the character, the photo and the like, the filter method is employed in the same manner as the case of discriminating at the pixel unit mentioned above, and it is possible to employ various kinds of methods such as a method of expanding this at an object unit, a method of determining this from a standard deviation of the pixel data within the object, a method of determining a histogram of the pixel data within the object, a method of directly designating via a printer driver and the like by an operator, and the like.

It is possible to apply an optimum halftone process to the various kinds of images by performing the image field discrimination at one pixel unit, performing at a block unit or performing an object unit, no transient turbulence is generated on the boundary between the respective image fields, and the image can be stably reproduced.

The discrimination result of the image field separation section 45 is also supplied to the color conversion section 41 and the UCR process section 42, this is because a more optimum image is obtained by reflecting the result of the image field separation to the image process section other than the halftone process section 44 such as adding a process of more emphasizing black in the UCR process section 42 when discriminating the edge of the image, or performing a color conversion suitable for the object, for example, performing a color conversion for the photo image and a color conversion for a graph image, in the case of performing the image discrimination at the object unit.

By performing the image process mentioned above, it is possible to perform the multi-level dither process with using the multi-level dither threshold value arrangement corresponding to the printing accuracy, it is possible to restrict an influence of the density unevenness and the vertical streak with keeping the resolution at a limit, and in the highlight portion of the image, it is possible to make the pixel in the highlight portion inconspicuous by using the threshold value arrangement having a more increased spatial frequency so as to restrict a granularity and more improve the gradation reproducibility, further, it is possible to perform an optimum halftone process according to the sort of the respective images such as the character/line image, the photo image and the like, and it is possible to keep a continuity in the reproduced image on the boundary.

In this case, in the embodiment mentioned above, a description was given of the embodiment of applying the halftone process to the image data of 8 bits and 256 gradations so as to set the output gradation number to 3 bits and 8 gradations at every colors, however, the structure is not limited to this, and it is possible to apply to an optional input gradation number and output gradation number. Further, the parameters such as the size and arrangement of the pattern and the depth of the multi-level level in the basic dither matrix are not limited to the embodiment mentioned above, and they can be optionally set by further introducing a cluster with taking the balance between the resolution and the gradation into consideration.

Figure 13:
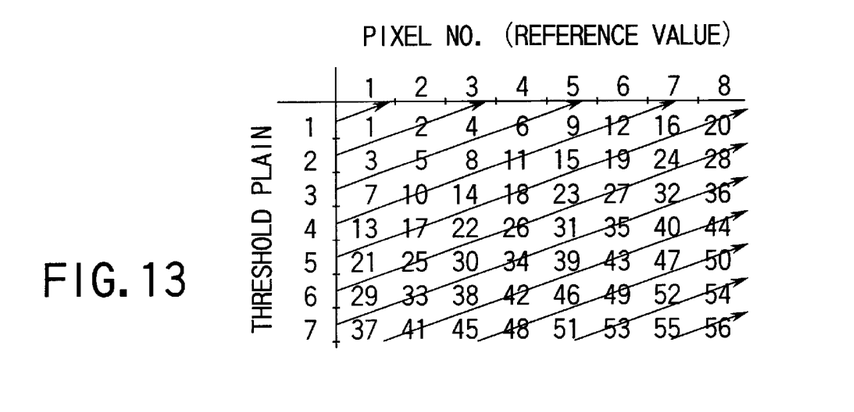
FIG. 13 is a view showing another example of the multi-level dither threshold value arrangement which the halftone process section in the embodiment uses.

Further, in the embodiment mentioned above, a description was given of the embodiment of the multi-level dither threshold value arrangement in which the spatial frequency at the low density portion is increased for restricting conspicuousness of the pixel at the low density portion, however, the structure is not always limited to this, as shown in FIG. 13, there can be employed a threshold value arrangement arranging threshold values so that an incline is at an uniform angle at all the density fields.

In this case, the embodiment is mentioned about the structure obtained by applying the invention to the color ink jet printer, however, the structure is not always limited to this, and it is possible to apply the invention to a monochrome ink jet printer, a thermal printer, an LED printer and the like.

As mentioned above, according to the present invention, it is possible to provide the image processing method which can perform the multi-level dither process with keeping a sufficient resolution in the case that the input gradation image data is the image such as the character/line image emphasizing a resolution and with keeping a sufficient gradation reproducibility in the case that it is the image such as the photo image emphasizing a gradation, can sufficiently restrict the transient discontinuity in the boundary of the image so as to sufficiently secure the continuity of the image between the boundaries, and can prevent the image deterioration due to the density unevenness and the like caused by the mechanism of the output section in the case of performing the printing on the basis of the output image data.

Further, according to the present invention, it is possible to provide the image processing apparatus which can perform the multi-level dither process with keeping a sufficient resolution in the case that the input gradation image data is the image such as the character/line image setting the resolution as import and with keeping a sufficient gradation reproducibility in the case that it is the image such as the photo image emphasizing a gradation, can sufficiently restrict the transient discontinuity in the boundary of the image so as to sufficiently secure the continuity of the image between the boundaries, and can prevent the image deterioration due to the density unevenness and the like caused by the mechanism of the output section in the case of performing the printing on the basis of the output image data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method comprising the steps of:
storing a plurality of multi-level dither threshold value arrangements employed for a multi-level dither process;
discriminating a given first gradation image data expressing one pixel by a first bit number into an image field emphasizing a resolution and an image field emphasizing a gradation;
selecting an optimum multi-level dither threshold value arrangement from a plurality of multi-level dither threshold value arrangements stored in the storing step on the basis of a discrimination result by the discriminating step; and
converting the gradation image data into a second gradation image data expressing one pixel by a second bit number less than the first bit number according to a multi-level dither process on the basis of the optimum multi-level dither threshold value arrangement selected by the selecting step.

2. An image processing method according to claim 1, wherein the discriminating step includes a discriminating step of discriminating a given first gradation image data expressing one pixel by a first bit number into a character/line image field emphasizing a resolution and a photo image field emphasizing a gradation.

3. An image processing method according to claim 1, wherein the converting step includes a converting step of converting the first gradation image data into a second gradation image data expressing one pixel by a second bit number less than the first bit number according to a multi-level dither process on the basis of the optimum multi-level dither threshold value arrangement selected by the selecting step with using a fixed basic dither matrix regardless of the discrimination result of the discriminating step.

4. An image processing method according to claim 1, wherein the storing step includes a plurality of multi-level dither threshold value arrangements (FIG. 8C and FIGS. 10A to 10D) having a plurality of dither threshold values regularly arranged in a dither matrix setting respective lines to a dither reference threshold value and a dither threshold value plane at arrangements of respectively different angles.

5. An image processing method according to claim 1, wherein the discriminating step includes a discriminating step of discriminating a given first gradation image data expressing one pixel by a first bit number into an image field emphasizing a resolution and an image field emphasizing a gradation, at a pixel unit.

6. An image processing method according to claim 1, wherein the discriminating step includes a discriminating step of discriminating a given first gradation image data expressing one pixel by a first bit number into an image field emphasizing a resolution and an image field emphasizing a gradation, at a block unit.

7. An image processing method according to claim 1, wherein the discriminating step includes a discriminating step of discriminating a given first gradation image data expressing one pixel by a first bit number into an image field emphasizing a resolution and an image field emphasizing a gradation, at an object unit.

8. An image processing method of applying a multi-level dither process to input gradation image data of M bits per one pixel on the basis of a multi-level dither threshold value arrangement so as to convert into image data having smaller gradation number of N bits (M>N) per one pixel, comprising the steps of:
preparing a plurality of multi-level dither threshold value arrangements regularly arranged at an incline having an angle in an oblique direction so that an order of the multi-level dither threshold value arrangements between a dither reference threshold value and a dither threshold value plane in a dither matrix rides over a plurality of dither threshold value planes, with differentiating incline angles of the arrangement order;
discriminating whether an image field is an image field emphasizing a resolution or an image field emphasizing a gradation with respect to the input gradation image data;
selecting a corresponding multi-level dither threshold value arrangement among the prepared plural number of multi-level dither threshold value arrangements according to an image discrimination result by the discriminating step; and
performing the multi-level dither process on the basis of the selected multi-level dither threshold value arrangement.

9. An image processing method of applying a multi-level dither process to input gradation image data of M bits per one pixel on the basis of a multi-level dither threshold value arrangement so as to convert into image data having smaller gradation number of N bits (M>N) per one pixel, comprising the steps of:
preparing a plurality of multi-level dither threshold value arrangements regularly arranged at an incline so that an order of the multi-level dither threshold value arrangements between a dither reference threshold value and a dither threshold value plane in a dither matrix increases a spatial frequency in a low density portion of the input gradation image data and regularly arranged at an incline having an angle in an oblique direction so that it rides over a dither threshold value planes between an intermediate density portion and a high density portion, with differentiating angles of the incline of the arrangement order;
discriminating whether an image field is an image field emphasizing a resolution or an image field emphasizing a gradation with respect to the input gradation image data;
selecting a corresponding multi-level dither threshold value arrangement among the prepared plural number of multi-level dither threshold value arrangements according to an image discrimination result by the discriminating step; and
performing the multi-level dither process on the basis of the selected multi-level dither threshold value arrangement.

10. An image processing apparatus comprising:
storing means of storing a plurality of multi-level dither threshold value arrangements employed for a multi-level dither process;
discriminating means of discriminating a given first gradation image data expressing one pixel by a first bit number into an image field emphasizing a resolution and an image field emphasizing a gradation;
selecting means of selecting an optimum multi-level dither threshold value arrangement from a plurality of multi-level dither threshold value arrangements stored in the storing step on the basis of a discrimination result by the discriminating step; and
converting means of converting the gradation image data into a second gradation image data expressing one pixel by a second bit number less than the first bit number according to a multi-level dither process on the basis of the optimum multi-level dither threshold value arrangement selected by the selecting step.

11. An image processing apparatus according to claim 10, wherein the discriminating means includes discriminating means of discriminating a given first gradation image data expressing one pixel by a first bit number into a character/line image field emphasizing a resolution and a photo image field emphasizing a gradation.

12. An image processing apparatus according to claim 10, wherein the converting means includes converting means of converting the first gradation image data into a second gradation image data expressing one pixel by a second bit number less than the first bit number according to a multi-level dither process on the basis of the optimum multi-level dither threshold value arrangement selected by the selecting means with using a fixed basic dither matrix regardless of the discrimination result of the discriminating means.

13. An image processing apparatus according to claim 10, wherein the storing means includes a plurality of multi-level dither threshold value arrangements (FIG. 8C and FIGS. 10A to 10D) having a plurality of dither threshold values regularly arranged in a dither matrix setting respective lines to a dither reference threshold value and a dither threshold value plane at arrangements of respectively different angles.

14. An image processing apparatus according to claim 10, wherein the discriminating means includes discriminating means of discriminating a given first gradation image data expressing one pixel by a first bit number into an image field emphasizing a resolution and an image field emphasizing a gradation, at a pixel unit.

15. An image processing apparatus according to claim 10, wherein the discriminating means includes discriminating means of discriminating a given first gradation image data expressing one pixel by a first bit number into an image field emphasizing a resolution and an image field emphasizing a gradation, at a block unit.

16. An image processing apparatus according to claim 10, wherein the discriminating means includes discriminating means of discriminating a given first gradation image data expressing one pixel by a first bit number into an image field emphasizing a resolution and an image field emphasizing a gradation, at an object unit.

17. An image processing apparatus of applying a multi-level dither process to input gradation image data of M bits per one pixel on the basis of a multi-level dither threshold value arrangement so as to convert into image data having smaller gradation number of N bits (M>N) per one pixel, comprising:

preparing means for preparing a plurality of multi-level dither threshold value arrangements regularly arranged at an incline having an angle in an oblique direction so that an order of the multi-level dither threshold value arrangements between a dither reference threshold value and a dither threshold value plane in a dither matrix rides over a plurality of dither threshold value planes, with differentiating angles of the incline of the arrangement order;

discriminating means for discriminating whether an image field is an image field emphasizing a resolution or an image field emphasizing a gradation with respect to the input gradation image data;

selecting means for selecting a corresponding multi-level dither threshold value arrangement among the prepared plural number of multi-level dither threshold value arrangements according to an image discrimination result by the discriminating step; and multi-level dither process means for performing the multi-level dither process on the basis of the selected multi-level dither threshold value arrangement.

18. An image processing apparatus of applying a multi-level dither process to input gradation image data of M bits per one pixel on the basis of a multi-level dither threshold value arrangement so as to convert into image data having smaller gradation number of N bits (M>N) per one pixel, comprising:

preparing means for preparing a plurality of multi-level dither threshold value arrangements regularly arranged at an incline so that an order of the multi-level dither threshold value arrangements between a dither reference threshold value and a dither threshold value plane in a dither matrix increases a spatial frequency in a low density portion of the input gradation image data and regularly arranged at an incline having an angle in an oblique direction so that it rides over a dither threshold value planes between an intermediate density portion and a high density portion, with differentiating angles of the incline of the arrangement order;

discriminating means for discriminating whether an image field is an image field emphasizing a resolution or an image field emphasizing a gradation with respect to the input gradation image data;

selecting means for selecting a corresponding multi-level dither threshold value arrangement among the prepared plural number of multi-level dither threshold value arrangements according to an image discrimination result by the discriminating step; and multi-level dither process means for performing the multi-level dither process on the basis of the selected multi-level dither threshold value arrangement.

\* \* \* \* \*